June 5, 1934.  W. J. BROWER  1,961,682
BROODER
Filed April 9, 1931   2 Sheets-Sheet 1

Inventor
William J. Brower

By Clarence A. O'Brien
Attorney

June 5, 1934.  W. J. BROWER  1,961,682
BROODER
Filed April 9, 1931   2 Sheets-Sheet 2
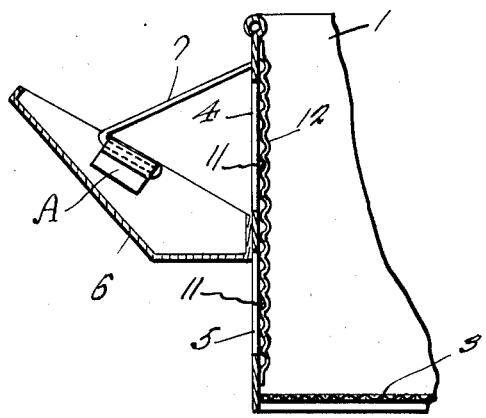
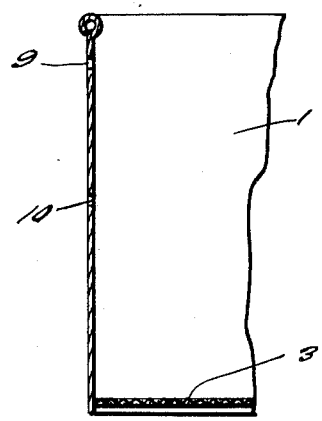
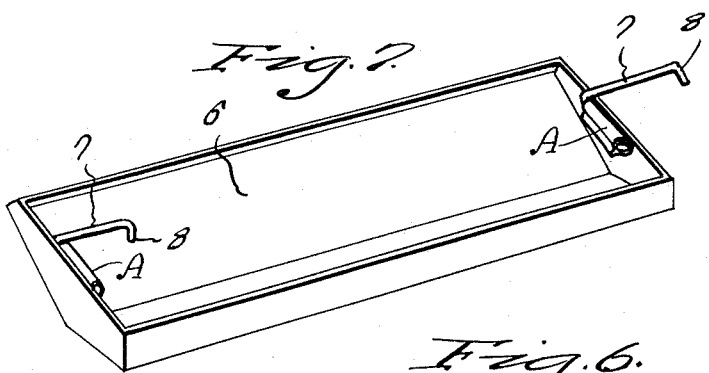
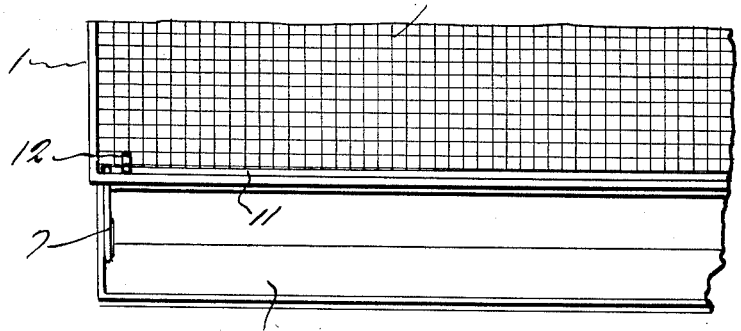
Inventor
William J. Brower
By Clarence A. O'Brien
Attorney Patented June 5, 1934

1,961,682

UNITED STATES PATENT OFFICE 1,961,682

BROODER

William J. Brower, Quincy, Ill., assignor to Brower Manufacturing Company, Quincy, Ill.

Application April 9, 1931, Serial No. 528,894

4 Claims. (Cl. 119—19)

This invention relates to poultry brooders, and has for its primary object to provide, in a manner as hereinafter set forth, a device of this character embodying a novel feeding or watering construction and arrangement whereby the poultry may be raised from the chicks to the "broiler" stage in the same brooder and without the necessity of materially altering same structurally.

Other objects of the invention are to provide a brooder of the character described which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a sectional view similar to Figure 3, but showing the trough in its elevated position.

Figure 5 is a fragmentary vertical sectional view taken substantially on the line 5—5 of Figure 1, but with the trough omitted.

Figure 6 is a fragmentary view in top plan showing a portion of the feeding arrangement.

Figure 7 is a detail view in perspective of the feed trough.

Figure 8 is a detail view in side elevation of one of the supports or keepers for the guard rod.

Figure 1:
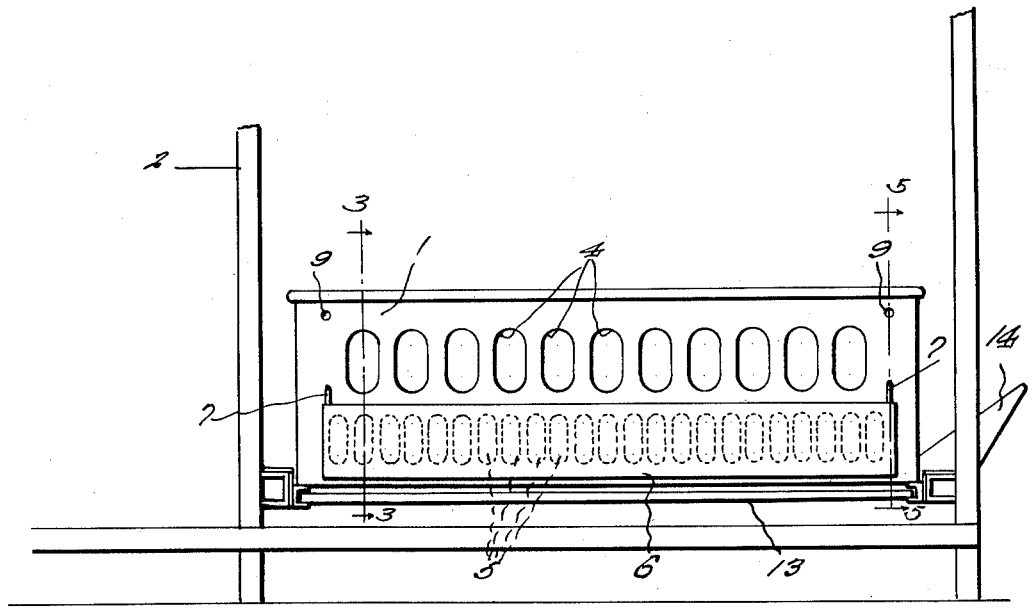
Figure 1 is a view in front elevation of a brooder embodying a feeding means in accordance with this invention.
Figure 2:
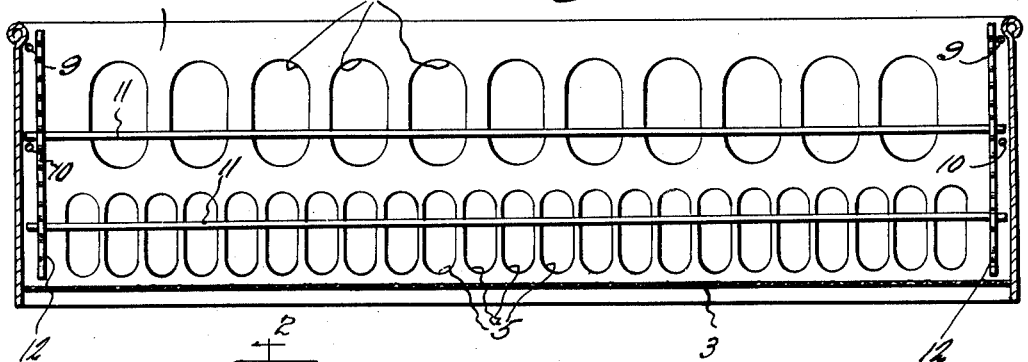
Figure 2 is a view in vertical sectional view through the drawer, taken substantially on the line 2—2 of Figure 3, the trough being omitted.

Referring to the drawings in detail, it will be seen that the reference numeral 1 designates a drawer or enclosure which is slidably mounted on a suitable supporting structure 2, said drawer 1 having, as usual, a wire mesh bottom 3. The vertical walls of the drawer 1 are preferably, but not necessarily, of substantially panel form. The term "panel" is used herein to describe walls of substantially solid or plate-like form as distinguished from foraminous walls.

In at least one of the vertical walls of the drawer 1, there is provided a horizontally extending series of comparatively large upper openings 4 below which there is also provided a horizontally extending series of comparatively small openings 5. Mounted exteriorly of the drawer 1 on said one side thereof is a feed trough 6 of suitable construction which is vertically adjustable on the drawer for disposition adjacent the openings 5 or 4 in the manner illustrated in Figures 3 and 4 of the drawings through the medium of supporting rods 7 which are secured to the end walls of the feed trough by eyes A on said end walls and which are provided with hooks 8 on their free ends to be selectively inserted in the upper and lower pairs of openings 9 and 10 respectively which are provided therefore in the drawer 1.

There is provided for each series of openings a horizontally disposed guard rod 11 which is mounted for vertical adjustment on the inner side of the wall of the drawer 1 in which the feed openings are provided through the medium of the vertically disposed, resilient, corrugated keepers 12 which are provided adjacent the ends of the series of openings. The upper and lower end portions of the keepers 12 are secured in any suitable manner, as by welding, to the drawer 1 and, if necessary or desirable, the keepers may also be secured to the drawer at intermediate portions thereof. The end portions of the guards 11 extend between the keepers 12 and the adjacent walls of the drawer 1 and seat in the corrugations of said keepers. The keepers 12 are sufficiently resilient to permit the same to be sprung inwardly from the wall upon which they are mounted to permit the guard rods to be adjusted vertically.

Figure 3:
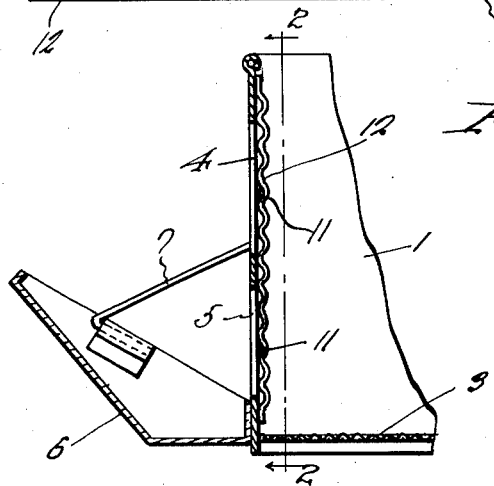
Figure 3 is a fragmentary view in vertical cross section taken substantially on the line 3—3 of Figure 1, but showing the guard rods in position.

In use, when chicks are housed in the brooder the feed trough 6 is mounted in its lower position, as seen in Figure 3 of the drawings, the lower guard rod 11 is adjusted to prevent the escape of the chicks through the lower openings 5 but to permit said chicks to insert their heads through the opening and feed from the trough 6, as will be obvious. As the chicks grow the lower guard rod is adjusted as desired. A foraminous screen may, if desired be placed over the upper feed openings 4 to prevent the escape of the chicks therethrough.

This foraminous screen forms no part of the present invention and, therefore is not shown in the drawings.

When the chicks become too large to feed conveniently through the comparatively small lower openings 5, the trough 6 is raised to its upper position as seen in Figure 4 of the drawings and the aforementioned screen is removed and the upper guard rod 11 is adjusted to permit feeding through the upper openings 4 but to prevent escape through said upper openings. It will thus be seen that the poultry may be housed in the drawer 1 until said poultry has reached the broiler stage and is ready for the market.

The drawer 1 is one of a plurality or battery of such drawers which are mounted in superposed relation on the supporting structure 2, said drawers being removable by sliding same in a horizontal plane out of the supporting structure. Such an arrangement of the drawers is conventional and forms no part of the invention. In Figure 1 of the drawings the reference numeral 13 designates a removable tray which is mounted on the supporting structure beneath the drawer to receive droppings which fall through the mesh bottom 3 of the drawer. While the structure herein described in detail is for feeding the poultry, it is understood that another side of the drawer 1 may be similarly constructed and equipped for watering the poultry, a watering trough being seen in Figure 1 of the drawings and designated by the reference numeral 14.

It is believed that the many advantages of a brooder constructed in accordance with this invention will be readily understood, and although the preferred embodiment of the invention has been illustrated and described, it is to be understood that changes in the details of construction and in the arrangement of parts may be resorted to which will fall within the scope of the invention as claimed.

What is claimed is:

1. A brooder having a series of feed openings in one of its walls, a guard rod traversing the openings, and means for mounting the guard rod for vertical adjustment on said one wall, said means comprising a pair of vertically disposed, resilient, corrugated keepers mounted on said one wall adjacent the ends of the series of openings, the end portions of the rods being disposed between the keepers and said one wall, the keepers being adapted to be flexed away from said one wall in a manner to permit vertical adjustment of the guard rod.

2. In combination, a brooder having upper and lower openings therein and further having comparatively large and small upper and lower feed openings therein, a trough, eyes on the ends of the trough, rods secured, at one end, in the eyes, and hooks on the free ends of the rods selectively engageable in the first named openings for adjustably mounting the trough on the brooder selectively adjacent the upper or lower feed openings.

3. In combination, a brooder including a substantially panel wall having comparatively large and small upper and lower feed openings therein and further having additional upper and lower openings therein, a trough, and means on the trough engageable selectively in the last-named upper and lower openings for mounting said trough selectively adjacent the upper or lower feed openings.

4. In combination, a brooder including a substantially panel wall having comparatively large and small upper and lower feed openings therein and further having additional upper and lower openings therein, a trough, and hooks on the trough engageable selectively in the last named openings for mounting said trough selectively adjacent the upper or lower feed openings, said trough bearing, at one side, against the brooder.

WILLIAM J. BROWER.